US008892502B2

(12) United States Patent
Hermann et al.

(10) Patent No.: US 8,892,502 B2
(45) Date of Patent: Nov. 18, 2014

(54) PARALLEL PROCESSING OF SEMANTICALLY GROUPED DATA IN DATA WAREHOUSE ENVIRONMENTS

(75) Inventors: Alexander Hermann, Neulussheim (DE); Hannes Jakschitsch, Walldorf (DE)

(73) Assignee: SAP SE, Walldorf (DE)

( * ) Notice: Subject to any disclaimer, the term of this patent is extended or adjusted under 35 U.S.C. 154(b) by 64 days.

(21) Appl. No.: 13/314,076

(22) Filed: Dec. 7, 2011

(65) Prior Publication Data

US 2013/0151464 A1 Jun. 13, 2013

(51) Int. Cl.
*G06F 17/30* (2006.01)

(52) U.S. Cl.
USPC .......... 707/600; 707/713; 707/747; 707/764; 718/1; 718/107; 382/304

(58) Field of Classification Search
CPC ....................................................... G06F 17/30
USPC ............. 707/600, 713, 747, 764; 718/1, 107; 382/304
See application file for complete search history.

(56) References Cited

U.S. PATENT DOCUMENTS

| | | | |
|---|---|---|---|
| 5,761,652 A * | 6/1998 | Wu et al. ............................... | 1/1 |
| 7,103,590 B1 * | 9/2006 | Murthy et al. ........................ | 1/1 |
| 7,366,755 B1 | 4/2008 | Cuomo et al. | |
| 7,818,349 B2 * | 10/2010 | Frost .............................. | 707/802 |
| 2010/0192148 A1 * | 7/2010 | Chen et al. ........................ | 718/1 |
| 2010/0322250 A1 * | 12/2010 | Shetty et al. .............. | 370/395.32 |
| 2010/0332458 A1 * | 12/2010 | Xu et al. ........................ | 707/673 |
| 2011/0066617 A1 * | 3/2011 | Liu et al. ........................ | 707/737 |

OTHER PUBLICATIONS

Sun et al., "Dynamic Maintenance of Multidimensional Range Data Partitioning for Parallel Data Processing", http://dl.acm.org/citation.cfm?doid=294260.294275, 1998.*
"Parallelism and Partitioning in Data Warehouses", Oracle9i, Data Warehousing Guide, Release 2 (9.2), Mar. 2002.
Extended European Search Report dated May 3, 2013, for corresponding EP application No. 12005911.8.

* cited by examiner

*Primary Examiner* — Dennis Truong
(74) *Attorney, Agent, or Firm* — Mintz Levin Cohn Ferris Glovsky and Popeo, P.C.

(57) ABSTRACT

A system and method for parallel processing of semantically grouped data in data warehouse environments is disclosed. A datastore object having a number of records is generated in a data warehouse application. A hash value is added to each record. The hash value has an integer domain, and is uniformly distributed over the integer domain across the datastore object. A selection table is generated to create a number of tasks based on discrete ranges of the hash value. Then, a transformation routine is executed on each of the number of tasks in parallel to generate an infocube of data that corresponds to each range of the discrete ranges of the hash value.

14 Claims, 7 Drawing Sheets

FIG. 1A

| REQUEST | RECORD NUMBER | Billing Number | Billing Date | Amount |
|---|---|---|---|---|
| 1 | 1 | A1 | 2011-01-01 | 10 |
| 1 | 2 | A1 | 2011-01-15 | 30 |
| 1 | 3 | A1 | 2011-02-01 | 20 |
| 1 | 4 | B2 | 2011-01-02 | 10 |
| 1 | 5 | A1 | 2011-02-05 | 0 |

| REQUEST | RECORDNUMBER | Billing Number | Billing date | Booked | Amount |
|---|---|---|---|---|---|
| 1 | 1 | A1 | 2011-01-01 | X | 10 |
| 1 | 2 | B2 | 2011-01-01 | X | 20 |
| 1 | 3 | A1 | 2011-01-15 |   | 30 |
| 1 | 4 | B2 | 2011-01-15 | X | 20 |
| 1 | 5 | C3 | 2011-02-03 | X | 10 |

| Month | Amount |
|---|---|
| 2011-01 | 40 |
| 2011-02 | 10 |

| REQUEST | RECORD NUMBER | Hash Value | Billing Number | Billing date | Booked | Amount |
|---|---|---|---|---|---|---|
| 1 | 1 | | A1 | 2011-01-01 | X | 10 |
| 1 | 2 | | B2 | 2011-01-01 | X | 20 |
| 1 | 3 | | A1 | 2011-01-15 | | 30 |
| 1 | 4 | | B2 | 2011-01-15 | X | 20 |
| 1 | 5 | | C3 | 2011-02-03 | X | 10 |

| REQUEST | RECORD NUMBER | Hash Value | Billing Number | Billing date | Booked | Amount |
|---|---|---|---|---|---|---|
| 1 | 1 | 10 | A1 | 2011-01-01 | X | 10 |
| 1 | 2 | 5 | B2 | 2011-01-01 | X | 20 |
| 1 | 3 | 10 | A1 | 2011-01-15 | | 30 |
| 1 | 4 | 5 | B2 | 2011-01-15 | X | 20 |
| 1 | 5 | 1 | C3 | 2011-02-03 | X | 10 |

| Request | Task | HASH FROM | HASH TO |
|---|---|---|---|
| | | | |

FIG. 7A

| Request | Task | HASH FROM | HASH TO |
|---|---|---|---|
| 1 | 1 | 1 | 2 |
| 1 | 2 | 5 | 6 |
| 1 | 3 | 9 | 10 |

FIG. 7B

| REQUEST | RECORD NUMBER | Hash Value | Billing Number | Billing date | Booked | Amount |
|---|---|---|---|---|---|---|
| 1 | 5 | 1 | C3 | 2011-02-03 | X | 10 |

Figure 8: data selected from process 1

| REQUEST | RECORD NUMBER | Hash Value | Billing Number | Billing date | Booked | Amount |
|---|---|---|---|---|---|---|
| 1 | 2 | 5 | B2 | 2011-01-01 | X | 20 |
| 1 | 4 | 5 | B2 | 2011-01-15 | X | 20 |

Figure 9: data selected from process 2

| REQUEST | RECORD NUMBER | Hash Value | Billing Number | Billing date | Booked | Amount |
|---|---|---|---|---|---|---|
| 1 | 1 | 10 | A1 | 2011-01-01 | X | 10 |
| 1 | 3 | 10 | A1 | 2011-01-15 | X | 30 |

Figure 10: data selected from process 3

PARALLEL PROCESSING OF SEMANTICALLY GROUPED DATA IN DATA WAREHOUSE ENVIRONMENTS

TECHNICAL FIELD

The subject matter described herein relates to data warehousing, and more particularly to parallel processing of semantically grouped data in data warehouse environments.

BACKGROUND

Enterprise Data Warehouses serve as a vital platform on which various applications of several companies are embedded. The applications can include Business Intelligence (BI), Customer Relationship Management (CRM), and Enterprise Resource Planning (ERP), for example. As they are embedded in an enterprise-wide (or even world-wide) system landscape, there are often conflicting problems of high volumes of data and a well-defined, narrow time slot for processing the data.

Effective data processing in terms of utilizing available hardware is a key requirement to improve the performance of a data warehouse and to reduce times for providing the data.

Figure 1A:
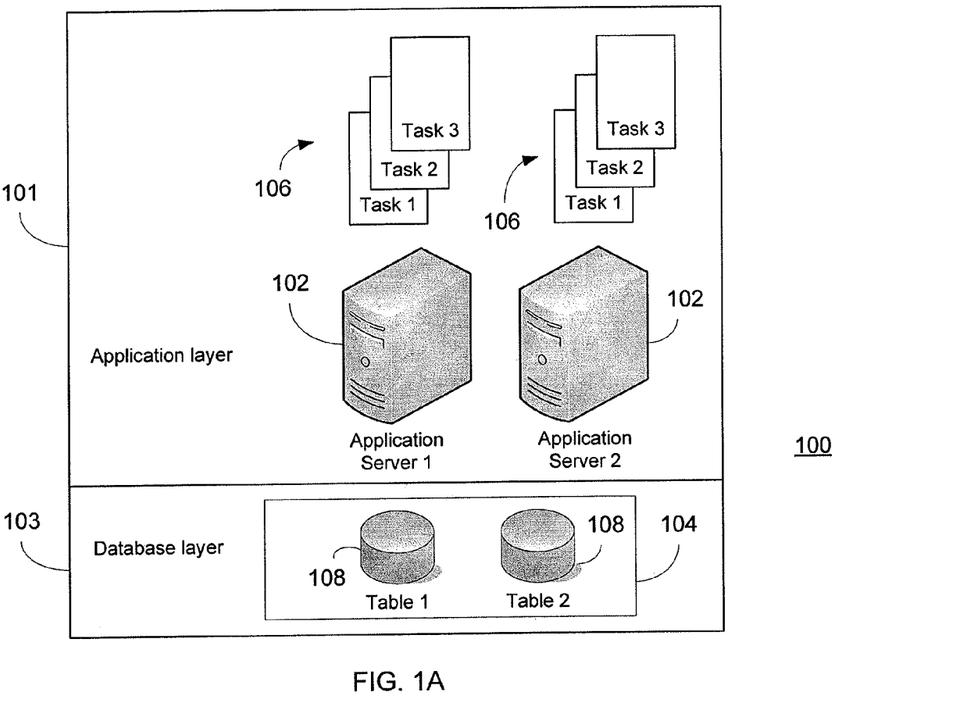
FIG. 1A illustrates a data warehouse application platform.

As shown in FIG. 1A, a data warehouse application platform 100 will often have a two-tier architecture: one or more application servers 102 of an application layer 101 each host one or more data warehouse applications. The application servers 102 are connected to a database management system (DBMS) 104 of a database layer 103, and different (parallel running) tasks 106 running on each application server 102 have to process data reads from the tables 108 stored on the DBMS 104. The DBMS 104 can include one or more servers. Meanwhile, data targets, such as InfoCubes, DataStore objects, etc., are modeled by data warehouse users to support different applications and decision making. The data to be processed is most often structured and the metadata is composed from data models, in what is known as a model driven architecture. Thus, the semantics of the data is unknown from the perspective of the generic data warehouse application.

Figure 1B:
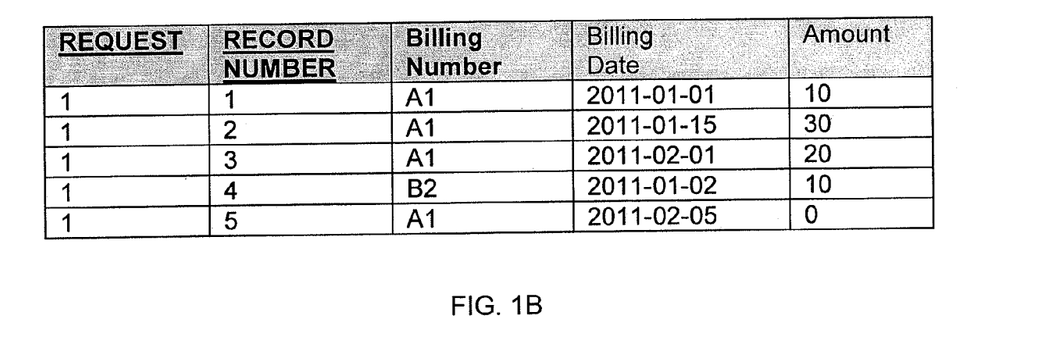
FIG. 1B shows an example of data to be processed by a data warehouse application.

The data to be processed is often time dependent. For instance, as illustrated in FIG. 1B, if the data warehouse application extracts billing items from a source system, the order of modifications in the source system for one specific item have to be adhered to in order to calculate the right delta values. To support this requirement, technical keys (e.g. REQUEST, RECORDNUMBER) are used in addition to the semantic keys (e.g. billing number).

Figure 2:
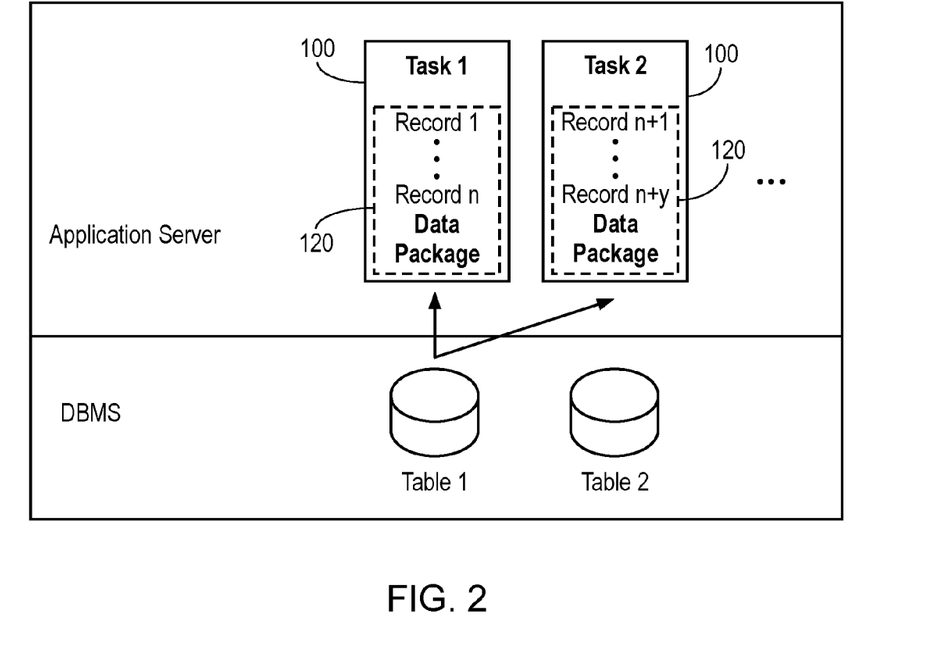
FIG. 2 illustrates a data package generated by each task from an application server.

Data processing steps (e.g. data activation in a DataStore object, data loads from one data target into another one, etc.) are critical for performance. To be able to deal with mass data, the data processing steps have to be distributed over multiple application servers using different tasks 106, and the data has to be split accordingly. Typically, one task 106 processes only a subset of the data, known as a data package, as shown in FIG. 2. To control the server workload, the number of records to be processed by one task has to be maintained by the user (package size). Furthermore, to avoid data loss due to concurrent tasks, records for one specific semantic key must be in the same package. If the records were processed by different tasks in parallel the precondition mentioned in 005 could be violated. As an example, as shown in FIG. 1B, records with record number 1, 2, 3 and 5 have to be processed by one task; while record number 4 can be processed by a different task.

In current data warehouse environments, task handling according to the conditions described above is one of the limiting factors. A task itself cannot determine the data package to be processed since, due to the model driven architecture, there is no selection criterion which ensures that all records for one specific semantic key are read, that records of any package size are processed, and that each record is processed by exactly one process.

Since a task is not able to select its data, the degree of parallelization is restricted since all tasks are dependent on the main process. Accordingly, there needs to be one main process which creates the data packages and passes the result to a task.

SUMMARY

This document describes a method and system implementing a task handling algorithm. This algorithm enables a data warehouse application to scale with the number of parallel tasks, without being restricted to a main process creating data packages.

In one aspect, a method is presented for parallel processing of semantically-grouped data in a data warehousing environment. The method includes generating a datastore object by one or more processors of a data warehouse application. The datastore object has a number of records. The method further includes adding a hash value to each record, the hash value having an integer domain, where the hash value is uniformly distributed over the integer domain across the datastore object. The method further includes generating a selection table to create a number of tasks based on discrete ranges of the hash value, and executing a transformation routine on each of the number of tasks in parallel to generate an infocube of data that corresponds to each range of the discrete ranges of the hash value.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide a method and system for implementing a task handling and data distribution algorithm that enables a data warehouse application to scale with the number of parallel tasks, without being restricted to a main process creating data packages.

Figure 3:
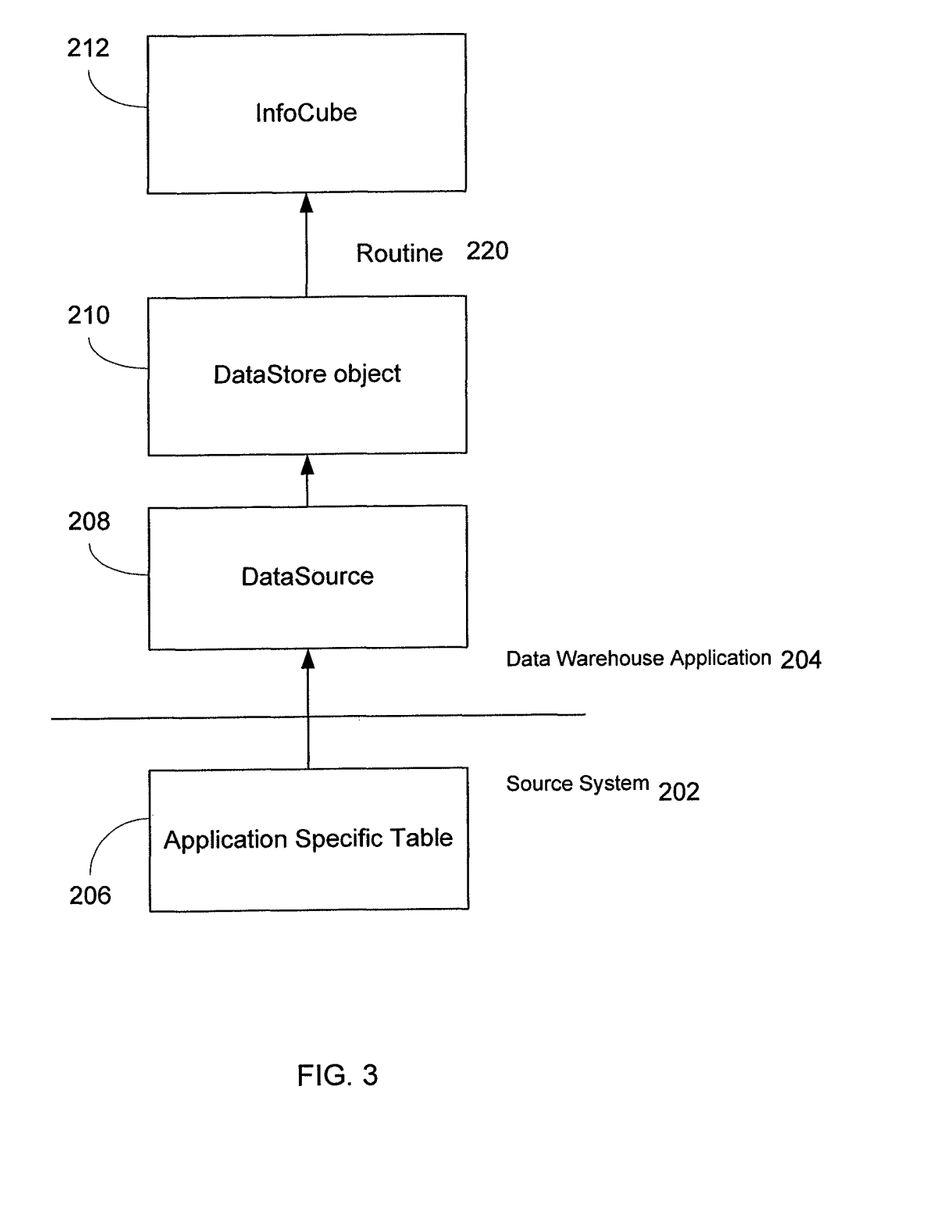
FIG. 3 shows a dataflow from a source system to a data warehouse application.

FIG. 3 is a process flow diagram illustrating a modeled dataflow from source system 202 to a data warehouse application 204. The source system 102 can be a server, for example, and provides an application-specific table 206 to a datasource 208 of the data warehouse application 204. The datasource 208 provides a datastore object 210, on which a transformation routine 220 can be run to produce an infocube 212 or similar data structure. The transformation routine 220 implements application logic between the datastore object 210 and the infocube 212, and provides the requirement that a task (for which the routine is performed) has all records for one specific semantic key in its data package.

Figure 4:
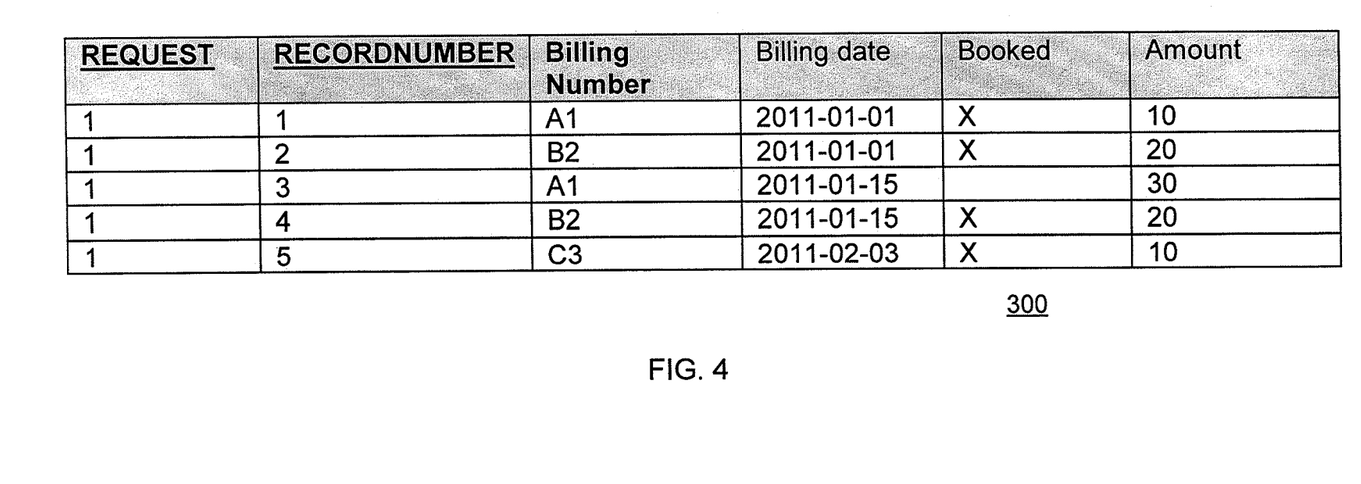
FIG. 4 shows a part of a datastore object.
Figure 5:
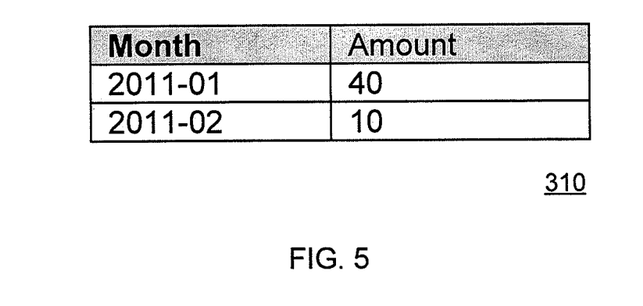
FIG. 5 shows a part of an infocube.

FIG. 4 shows an example datastore object 300. In the datastore object 300, billing items are stored with the creation date and a "booked" flag. FIG. 5 shows an example infocube 310, which is created to report on the billing items on a periodic basis, such as monthly. In the example infocube 310, only those billing items to be reported on a monthly basis should be available for reporting for which every entry in the datastore object 300 has a "booked" flag. If one of the entries for one specific semantic key has an initial "booked" flag, none of the entries should be updated to the infocube 310.

Assuming that data has to be processed in parallel using tasks, and a package size of two records, there is conventionally no selection criterion that can be used to select a proper data package from the datastore object following the above described requirements. Accordingly, a method and system described herein implements a task handling algorithm that works as follows.

Enhancement of the Source Structure

Figure 6A:
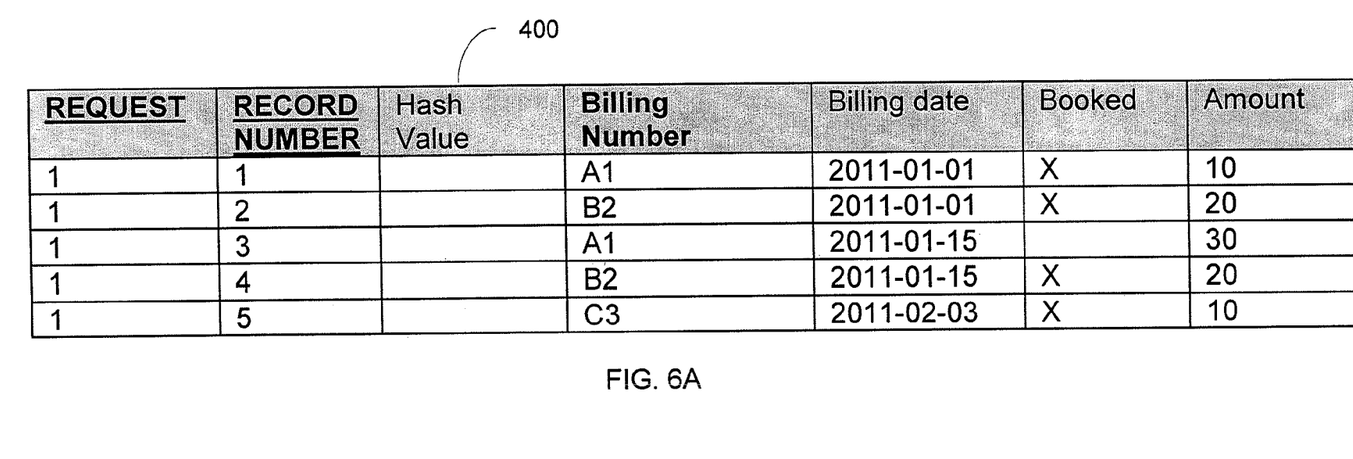
FIGS. 6A and 6B illustrate a datastore object enhanced with a hash function.
Figure 6B:
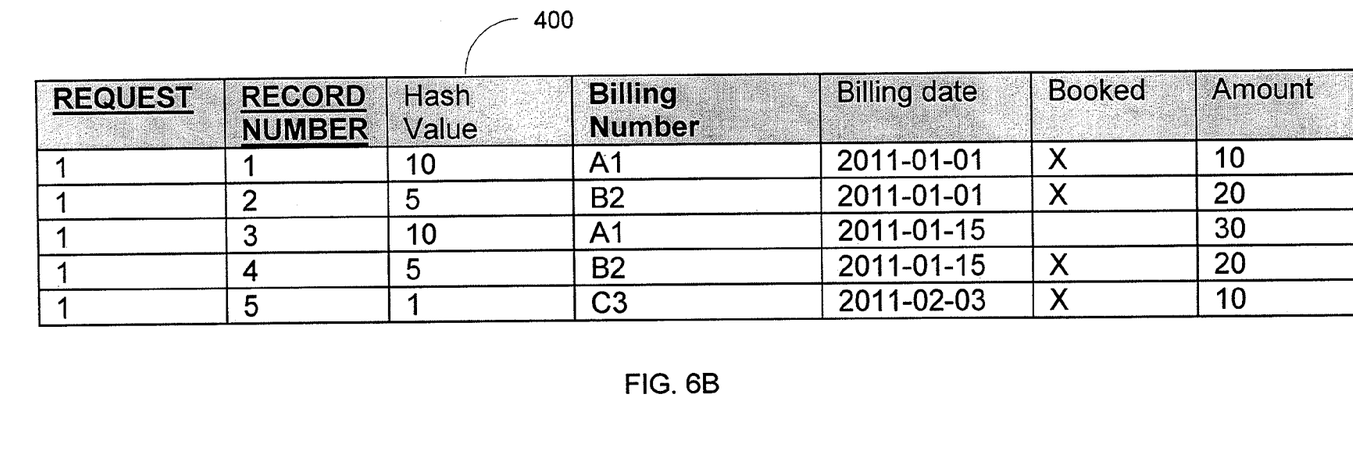

As shown in FIGS. 6A and 6B, the structure of the DataStore object is enhanced by a new field "HASH VALUE" with data type "Integer".

Changed Update Algorithm

When loading data into the datastore object the data gets enriched. A hash function is applied to the semantic key (Billing number) and maps the input domain (e.g. character) to the integer domain, as shown in FIG. 6B. It must be ensured that the hash algorithm is uniformly distributed (result values of the hash function are equally distributed over the integer domain). To reduce the complexity of this example, the hash function is exemplified here with a domain of [1 . . . 10], although any domain can be used.

Figure 7A:
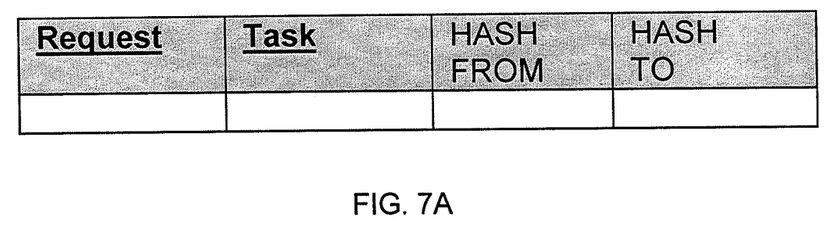
FIGS. 7A and 7B illustrate a selection table created based on a number of ranges of an integer value for the hash value.
Figure 7B:
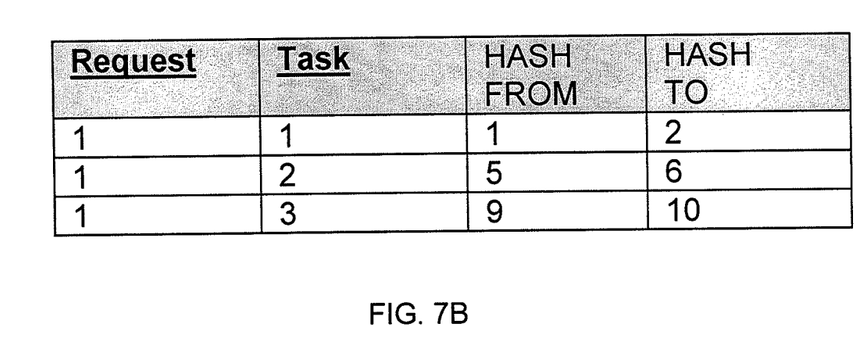

Further, an additional table is created which is used to store the selection criterion for a task, as shown in FIG. 7A. In the example, the data from datastore object is updated to the InfoCube using a package size of ~2 records. The hash function distributes its result equally from 1 to 10. With a package size of 2 records, potentially five tasks (10/2) have to be created. During the data load into the datastore object, the selection table is filled as shown in FIG. 7B (ranges without corresponding records are left out to prevent that tasks are started that work on empty data package).

Task Handling

When the upload from the datastore object to the infocube is started, a lookup into the selection table results in the number of tasks to be started.

SELECT MAX(task) FROM [selection criterion table]→3 tasks to be started

Each started task first reads its selection criterion, as exemplified as follows:

SELECT hash_from, hash_to
FROM [selection criterion table]
WHERE task = taskID

Thereafter, the task reads the data package to be processed, as exemplified as follows:

SELECT *
FROM [DataStore object]
WHERE hash from >= hash_from AND hash to <= hash_to
ORDER BY Billing number, Record number.

Figure 8:
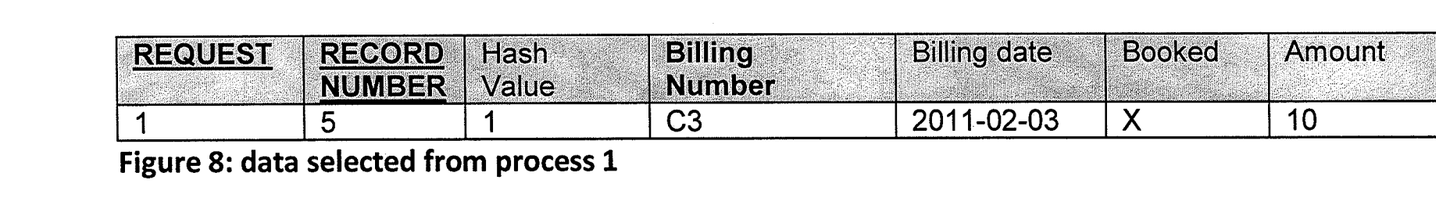
FIGS. 8-10 show tables of data selected from each process related to a task according to one of the number of ranges of hash values.
Figure 9:
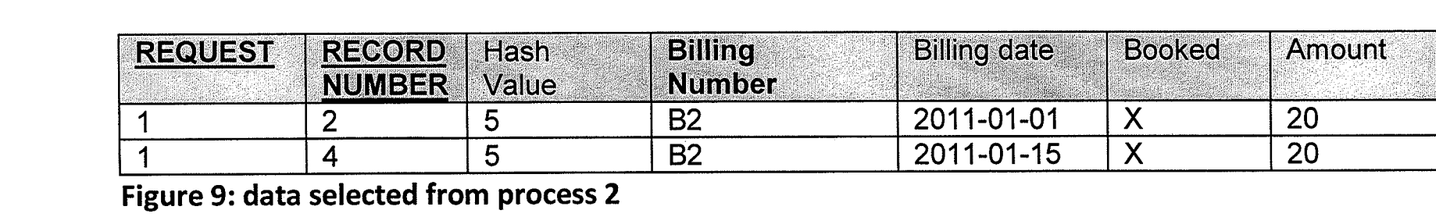
Figure 10:
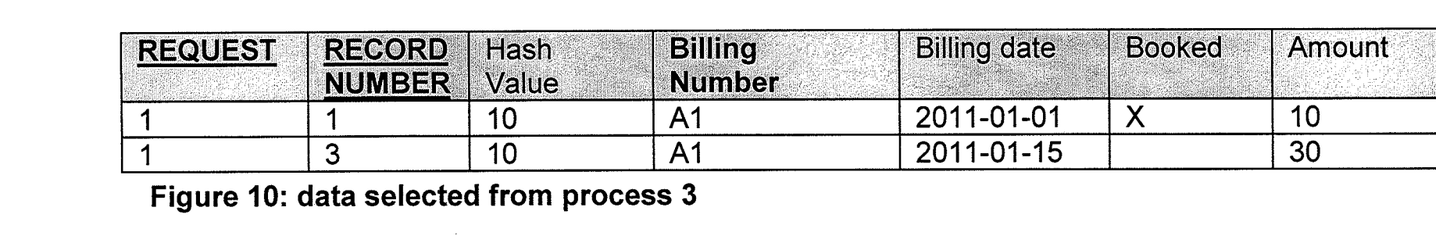

FIGS. 8-10 illustrate data selected from each process of the data package.

Accordingly, data warehouse application platforms can be enabled to process (load, activate, rollup, etc.) data in parallel without being bound to a reading main process, and to use semantically grouped data packages with a well defined package size. Further, a data warehouse application can now scale with the hardware used, and therefore the runtime is reduced dramatically when processing and providing mass data.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
generating a datastore object by one or more processors of a data warehouse application, the datastore object having a number of records;
adding, by the one or more processors, a hash value to each record, the hash value having an integer domain, the one or more processors uniformly distributing the hash value over the integer domain across the datastore object;
generating, by the one or more processors, a selection table to create a number of tasks based on discrete ranges of the hash value; and
executing, by the one or more processors, a transformation routine on each of the number of tasks in parallel to generate an infocube of data of a plurality of infocubes of data, each infocube corresponding to a respective range of the discrete ranges of the hash value.

2. The method in accordance with claim 1, wherein the transformation routine implements application logic between the datastore object and each respective infocube.

3. The method in accordance with claim 1, wherein each range of the discrete ranges of the hash value provides a specific data package for generating the infocube.

4. The method in accordance with claim 1, wherein executing a transformation routine further includes each of the number of tasks:
reading, using the one or more processors, one or more selection criteria from the selection table; and
reading, using the one or more processors, data from the datastore object according to the selection criteria.

5. A non-transitory computer program product comprising a machine-readable medium storing instructions that, when executed by at least one programmable processor, cause the at least one programmable processor to perform operations comprising:
generate a datastore object by one or more processors of a data warehouse application, the datastore object having a number of records;
add, by the one or more processors, a hash value to each record, the hash value having an integer domain, the one or more processors uniformly distributing the hash value over the integer domain across the datastore object;
generate, by the one or more processors, a selection table to create a number of tasks based on discrete ranges of the hash value; and
execute, by the one or more processors, a transformation routine on each of the number of tasks in parallel to generate an infocube of data of a plurality of infocubes of data, each infocube corresponding to a respective range of the discrete ranges of the hash value.

6. The computer program product in accordance with claim 5, wherein the transformation routine implements application logic between the datastore object and each respective infocube.

7. The computer program product in accordance with claim 5, wherein each range of the discrete ranges of the hash value provides a specific data package for generating the infocube.

8. A system comprising:
an application server having at least one programmable processor; and a machine-readable medium storing instructions that, when executed by the at least one processor, cause the at least one programmable processor to perform operations comprising:
- generate a datastore object by one or more processors of a data warehouse application, the datastore object having a number of records;
- add, by the one or more processors, a hash value to each record, the hash value having an integer domain, the one or more processors uniformly distributing the hash value over the integer domain across the datastore object;
- generate, by the one or more processors, a selection table to create a number of tasks based on discrete ranges of the hash value; and
- execute, by the one or more processors, a transformation routine on each of the number of tasks in parallel to generate a plurality of infocubes of data, each infocube of data corresponding to a respective range of the discrete ranges of the hash value.

9. The system in accordance with claim 8, wherein the transformation routine implements application logic between the datastore object and each respective infocube.

10. The system in accordance with claim 8, wherein each range of the discrete ranges of the hash value provides a specific data package for generating the infocube.

11. The method in accordance with claim 1, wherein each record characterizes a corresponding row in a table.

12. The method in accordance with claim 1, wherein the datastore object stores the number of records in a tabular format.

13. The method in accordance with claim 1, wherein each hash value comprises a number, and wherein two or more numbers corresponding to respective hash values are different.

14. The method in accordance with claim 1, wherein each range of the discrete ranges is associated with a different task of the number of tasks.

* * * * *